(12) United States Patent
Narukawa et al.

(10) Patent No.: US 8,551,439 B2
(45) Date of Patent: Oct. 8, 2013

(54) METHOD OF REFINING CARBON PARTS FOR PRODUCTION OF POLYCRYSTALLINE SILICON

(75) Inventors: Mitsutoshi Narukawa, Yokkaichi (JP); Kenichi Watabe, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 1058 days.

(21) Appl. No.: 12/559,826

(22) Filed: Sep. 15, 2009

(65) Prior Publication Data
US 2010/0068125 A1 Mar. 18, 2010

(30) Foreign Application Priority Data
Sep. 16, 2008 (JP) ................ 2008-236178

(51) Int. Cl.
*C09C 1/56* (2006.01)
(52) U.S. Cl.
USPC ........... 423/460; 502/160; 502/161; 502/168; 502/170
(58) Field of Classification Search
None
See application file for complete search history.

(56) References Cited

U.S. PATENT DOCUMENTS 5,419,889 A 5/1995 Matsumoto et al.

FOREIGN PATENT DOCUMENTS

| CH | 433206 A | 4/1967 |
|---|---|---|
| JP | 39-12246 | 7/1964 |
| JP | 1-40000 | 5/1983 |
| JP | 2649166 | 7/1989 |
| JP | 1-40000 | 8/1989 |
| JP | 2649166 | 9/1997 |
| JP | 3654418 A | 1/2001 |
| JP | 2004-2085 A | 1/2004 |
| JP | 2004-002085 A | 1/2004 |
| JP | 3654418 B | 6/2005 |

OTHER PUBLICATIONS

JP2004-002085, Ochiai, Machine translation, 2004-method for purifying carbon/graphite member.*
JP2001-026481, Matsubara, machine translation, 2001, method for regenerating carbon member used for producing semiconductor silicon.*
European Search Report dated Nov. 7, 2011, issued for the corresponding European patent application No. 09170207.6.
European Search Report dated Aug. 21, 2012, issued for the corresponding European Patent Application No. 12173364.6.

* cited by examiner

*Primary Examiner* — Melvin C Mayes
*Assistant Examiner* — Smita Patel
(74) *Attorney, Agent, or Firm* — Edwards Wildman Palmer LLP (57) ABSTRACT

A method of refining carbon parts for the production of polycrystalline silicon, comprises the steps of, replacing an inside gas of a reactor, in which the carbon parts are placed, with an inert gas, drying the carbon parts by raising a temperature in the reactor to a drying temperature of the carbon parts while flowing an inert gas through the reactor, raising a temperature in the reactor to a purification temperature higher than the drying temperature while flowing chlorine gas through the reactor, reducing a pressure in the reactor, maintaining the inside of the reactor in a reduced pressure, pressurizing the inside of the reactor by introducing chlorine gas for bringing the inside of the reactor into a pressurized state, and cooling the inside of the reactor.

14 Claims, 9 Drawing Sheets

METHOD OF REFINING CARBON PARTS FOR PRODUCTION OF POLYCRYSTALLINE SILICON

BACKGROUND OF THE INVENTION

1. Field of the Invention

The present invention relates to a method of refining unused carbon parts and used carbon parts which are used in the production of polycrystalline silicon.

Priority is claimed on Japanese Patent Application No. 2008-236178, filed Sep. 16, 2008, the content of which is incorporated herein by reference.

2. Description of Related Art

A production apparatus employing Siemens method is known as a polycrystalline silicon production apparatus. In this polycrystalline silicon production apparatus using the Siemens method, a number of silicon seed rods are arranged in the reactor. The silicon seed rods in the reactor are heated, and raw material gas including mixed gas of chlorosilane gas and hydrogen gas is supplied to the reactor to come into contact with the heated silicon seed rods. On a surface of a silicon seed rod, polycrystalline silicon is produced by a hydrogen reduction reaction and a thermal decomposition reaction of the raw material gas.

Electrodes or heaters made of carbon are used in this reactor so as not to contaminate the silicon. In the production of silicon for semiconductors, it is necessary to use particularly high-purity carbon parts. For this reason, carbon parts are refined prior to using them. When the carbon parts are refined, in a method shown in Japanese Patent Publication No. 2649166, a carbon part is placed in a flowing type reactor, and chlorine gas is flowed for 10 to 30 hours at 800 to 1100° C. to remove impurities inside the carbon parts. Additionally, the method shown in Japanese Examined Patent Application, Second Publication No. S39-12246 is a method of performing heat treatment continuously for at least 100 hours using exhaust gas at the production of polycrystalline silicon, thereby reducing a phosphorus component in carbon.

Additionally, a method shown in Japanese Examined Patent Application, Second Publication No. H1-40000 is a method of holding the temperature in a reactor, in which a carbon parts are placed, at 1000° C., and first performing heat treatment for about 3 hours in a gas including a halogen, for example, hydrogen chloride, then performing an evacuation to perform heat treatment for 4 hours in reduced pressure, and further performing heat treatment for 5 hours in a reduction atmosphere, such as a hydrogen atmosphere. Moreover, a method shown in Japanese Patent Unexamined Publication No. 2004-2085 is a method of performing a halogen treatment in a reactor, for example, for 20 hours at a high temperature of 2400 to 3000° C., and then, cooling carbon parts to 50° C. in an inert gas atmosphere, and taking out the carbon parts from the reactor, and a method shown in Japanese Patent Publication No. 3654418 is a method of peeling the silicon adhering to the surface of the carbon parts while removing a part of carbon base material, then performing heat treatment in chlorine gas atmosphere, and reducing impurities to reuse the carbon parts, when used carbon parts are recycled.

As described above, various kinds of methods have conventionally been suggested as the method of refining the carbon parts. However, impurities are contained into the inside of the carbon parts as well as the surfaces of the carbon parts. Therefore, in order to remove the impurities from the carbon parts, there is a problem in that a method of performing heat treatment on the carbon parts over a long time in the atmosphere of chlorine gas or the like at a high temperature is required, and the productivity is poor. Additionally, as for the method of reusing the carbon parts, since silicon adheres to the surfaces of the carbon parts in the production of polycrystalline silicon, removal of silicon and refinement of the carbon parts after the removal of silicon are required. Shaving off the silicon adhering to the surfaces of the carbon parts while removing a part of carbon member (base material) is shown in Japanese Patent Publication No. 3654418. However, polycrystalline silicon rods may collapse due to the deterioration of the strength of the carbon parts, which causes productivity decline.

SUMMARY OF THE INVENTION

The present invention was contrived in view of such a problem, and an object of the present invention is to efficiently remove impurities in a short period of time to improve the productivity, without performing continuous treatment on the carbon parts to be used as the carbon parts for the production of polycrystalline silicon over a long period of time at a high temperature. Another object of the present invention is to provide a method of refining the carbon parts, which can efficiently remove the silicon adhered to the surfaces of the used carbon parts without affecting the quality or strength of the carbon parts, and can obtain polycrystalline silicon which has the quality of semiconductor grades, without performing heat treatment over a long period of time.

The refining method of the present invention is a method of refining the carbon parts (unused carbon parts) for the production of polycrystalline silicon. The method of refining the carbon parts comprises the step of, (I-a) replacing an inside gas of a reactor, in which the carbon parts are placed, with an inert gas, (I-b) drying the carbon parts by raising a temperature in the reactor to a drying temperature of the carbon parts while flowing an inert gas through the reactor after the step of (I-a), (I-c) raising a temperature in the reactor to a purification temperature higher than the drying temperature while flowing chlorine gas through the reactor after the step of (I-b), (I-d) reducing a pressure in the reactor after the step of (I-c), (I-e) maintaining the inside of the reactor in a reduced pressure caused by the step of (I-d), (I-f) pressurizing the inside of the reactor by introducing chlorine gas for bringing the inside of the reactor into a pressurized state after the step of (I-e), and (I-g) cooling the inside of the reactor after the step of (I-f).

That is, this refining method introduces the inert gas into the reactor to prevent oxidation of the carbon parts or a material in the reactor at the time of a temperature rise in the reactor, and raises the temperature in the reactor to a drying temperature while the inert gas is flowed, thereby drying and removing the moisture adsorbed to the carbon parts. If this drying is insufficient, the chlorine gas and the moisture react with each other by the introduction of chlorine gas after drying, thereby generating hydrochloric acid to corrode a reactor material, and the carbon parts to be processed in the reactor are contaminated. In order to prevent this, it is necessary to sufficiently perform this drying step. Thereafter, the temperature in the reactor is raised to a purification temperature higher than the temperature at which the carbon parts are dried, while introducing chlorine gas, and impurity elements, such as boron and phosphorus, which are contained in the carbon parts, are made to react with the chlorine gas, and are thereby removed from the carbon parts. Then, the gas including the impurities in the reactor is discharged to the outside of the reactor by evacuating the inside of the reactor into a state of reduced pressure. Further, the impurities inside a carbon parts are more efficiently removed from the inside of the carbon parts by maintaining the inside of the reactor at a predetermined high temperature and reduced pressure after the step of reducing.

Next, the chlorine gas is made to permeate into the insides of the carbon parts, and is thereby made to sufficiently react with the impurities inside the carbon parts by introducing the chlorine gas into the reactor up to a pressurized state.

When the inside of the reactor is cooled, until the temperature in the reactor becomes the drying temperature, the chlorine gas may be introduced, and in the reactor at a temperature lower than the drying temperature, the inert gas may be introduced. This is because the chlorine remaining in the reactor and the moisture in the air is prevented from reacting with each other which corrodes the inside of the reactor, when the carbon parts are taken out from the inside of the reactor.

In this case, in the step of maintaining the inside of the reactor in a reduced pressure (the step of (I-e)) the pressure inside of the reactor is held in the range of about −0.1 MPa(G) to about −0.02 MPa(G) ("G" exhibits a gauge pressure) with respect to an atmospheric pressure. Furthermore, in the step of pressurizing the inside of the reactor (the step of (I-f)) the pressure inside of the reactor is pressed by introducing chlorine gas in the range of about 0.01 MPa(G) to about 0.05 MPa(G) with respect to an atmospheric pressure. Additionally, the drying temperature may be in the range of about 350° C. to about 600° C., and the purification temperature after drying of the carbon parts may be in the range of about 700° C. to about 1400° C.

Additionally, in the refining method of the present invention, before the inside of the reactor is cooled, the process from the step of reducing a pressure in the reactor (the step of (I-d)) to the step of pressurizing the inside of the reactor (the step of (I-f)) may be repeated two or more times.

By repeating the series of steps, the impurities included in the carbon parts are efficiently removed not only from the surfaces of the carbon parts but also from the insides thereof without performing continuous treatment on the impurities in an atmosphere of chlorine gas or the like for a long period of time at a high temperature.

The refining method of the present invention is also a method of refining the used carbon parts for production of polycrystalline silicon. The method of refining the used carbon parts comprises the step of, (II-a) replacing an inside gas of a reactor in which the used carbon parts are placed, with an inert gas, (II-b) drying the used carbon parts by raising a temperature in the reactor to a silicon striping temperature while flowing an inert gas through the reactor after the step of (II-a), (II-c) reducing a pressure in the reactor after the step of (II-b), (II-d) pressurizing the inside of the reactor by introducing chlorine gas after the step of (II-c), (II-e) maintaining the inside of the reactor in a pressurized state by introducing chlorine gas after the step of (II-d), (II-f) raising a temperature in the reactor to a purification temperature while flowing chlorine gas through the reactor after the step of (II-e), (II-g) reducing the pressure in the reactor after the step of (II-f), (II-h) maintaining the inside of the reactor in a reduced pressure caused by the step of (II-g), (II-i) pressing the inside of the reactor by introducing chlorine gas for bringing the inside of the reactor into a pressurized state after the step of (II-h), and (II-j) cooling the inside of the reactor after the step of (II-i).

That is, this refining method introduces the inert gas into the reactor and fills the inside of the reactor with the inert gas to prevent oxidation of the carbon parts or the components of the reactor at the time of a temperature rise in the reactor, and raises the temperature in the reactor to silicon striping temperature while the inert gas is flowed, thereby drying and removing the moisture adsorbed to the carbon parts. Thereafter, the step of reducing the pressure is performed in order to discharge the inert gas out of the system. Thereafter, chlorine gas is introduced into the reactor. The silicon accompanying deposition of polycrystalline silicon adheres to the surfaces of the used carbon parts, and the silicon reacts with the introduced chlorine gas, thereby producing silicon tetrachloride or the like of a low boiling point. Thereafter, the chlorine gas is continuously introduced into the reactor and a maintaining the inside of the reactor in a pressurized state by introducing chlorine gas over a required reaction amount (amount required for a reaction with the silicon adhering to the used carbon parts). Thereby, the heat is uniformly applied to the carbon parts, and adhering silicon is efficiently reacted with the chlorine gas without performing the treatment with a prolonged period of chlorine gas flow at a high temperature, and adhering silicon is converted into a low boiling point gas, such as silicon tetrachloride, and removed from the carbon parts.

That is, in removing the silicon, the carbon parts used for the production of polycrystalline silicon are made to react with the chlorine gas, and are chlorinated, and are thereby removed as silicon tetrachloride or the like with a low boiling point. In this treatment, if the treatment is performed at the temperature of, for example, 600° C. or higher, silicon may be produced due to the thermal decomposition of silicon tetrachloride or the like, and the silicon adheres to the inside of the reactor as well as the carbon parts. Therefore, the temperature in the reactor is preferably a temperature such that the silicon tetrachloride is not thermally decomposed.

Then, by performing a series of treatments by the same method as the method of refining the unused carbon parts after the silicon on the surfaces of the carbon parts is removed, impurities, such as phosphorus adhering to the surfaces of the carbon parts and the insides thereof, can be removed. As a result, the used carbon parts can be used for the production of polycrystalline silicon similarly to the unused carbon parts.

In the method of refining used carbon parts of the present invention, in the step of reducing a pressure in the reactor (the step of (II-c)) the pressure inside of the reactor is held in the range of about −0.1 MPa(G) to about −0.02 MPa(G) with respect to an atmospheric pressure. Furthermore, in the step of maintaining the inside of the reactor in a pressurized state by introducing chlorine gas (the step of (II-e)) the pressure inside of the reactor is pressed by introducing chlorine gas in the range of about 0.01 MPa(G) to about 0.05 MPa(G) with respect to an atmospheric pressure. Additionally, the silicon striping temperature may be in the range of about 350° C. to about 600° C. The purification temperature may be in the range of about 700° C. to about 1400° C.

Additionally, in the method of refining used carbon parts of the present invention, before shifting to the step of raising a temperature in the reactor to a purification temperature (the step of (II-f)), the process from the step of reducing a pressure in the reactor (the step of (II-c)) to the step of maintaining the inside of the reactor in a pressurized state (the step of (II-e)) may be repeated two or more times.

By repeating the series of treatments, the silicon adhering to the carbon parts is reliably removed from the carbon parts, and the generated silicon tetrachloride is discharged from the reactor.

The method of refining used carbon parts of the present invention may comprise a cooling step and a drying step between the step of maintaining the inside of the reactor in a pressurized state (the step of (II-e)) and the step of raising a temperature in the reactor to a purification temperature (the step of (II-f)). In the cooling step the inside of the reactor may be cooled, and then, in the drying step the temperature in the reactor may be raised to drying temperature and an inert gas may be flowed through the reactor to dry the carbon parts. The drying temperature in that case may be in the range of about 350° C. to about 600° C.

Additionally, in method of refining used carbon parts of the present invention, before the inside of the reactor is cooled, the process from the step of reducing the pressure in the reactor (the steps of (II-g)) to the step of pressing the inside of the reactor by introducing chlorine gas (the step of (II-i)) may be repeated two or more times.

According to the refining method of the present invention, in the case of the unused carbon parts used for the production of polycrystalline silicon, the carbon parts are brought into a reduced pressure state and a pressurized state by the chlorine gas after the chlorine supply treatment in a high temperature state. Thereby, it is possible to remove the impurities adhering to the insides of the carbon parts without performing heat treatment over a long period of time, and it is possible to improve the efficiency of treatment of the carbon parts.

Additionally, in the case of the used carbon parts, the reducing pressure treatment and the pressurizing treatment by the chlorine gas in a high temperature state are performed. Thereby, the silicon can be efficiently removed by evaporation without shaving off the silicon adhering to the surfaces of the carbon parts while removing a part of carbon member. Accordingly, since the carbon is not shaved off and the strength of the carbon parts do not deteriorate, polycrystalline silicon can be stably produced.

BRIEF DESCRIPTION OF THE DRAWINGS

FIGS. 5A and 5B are perspective views showing an example of the carbon parts placed in the reactor of FIG. 2, and specifically.

DETAILED DESCRIPTION OF THE INVENTION

Hereinafter, one embodiment of a method of refining carbon parts according to the present invention will be described referring to the drawings.

Figure 1:
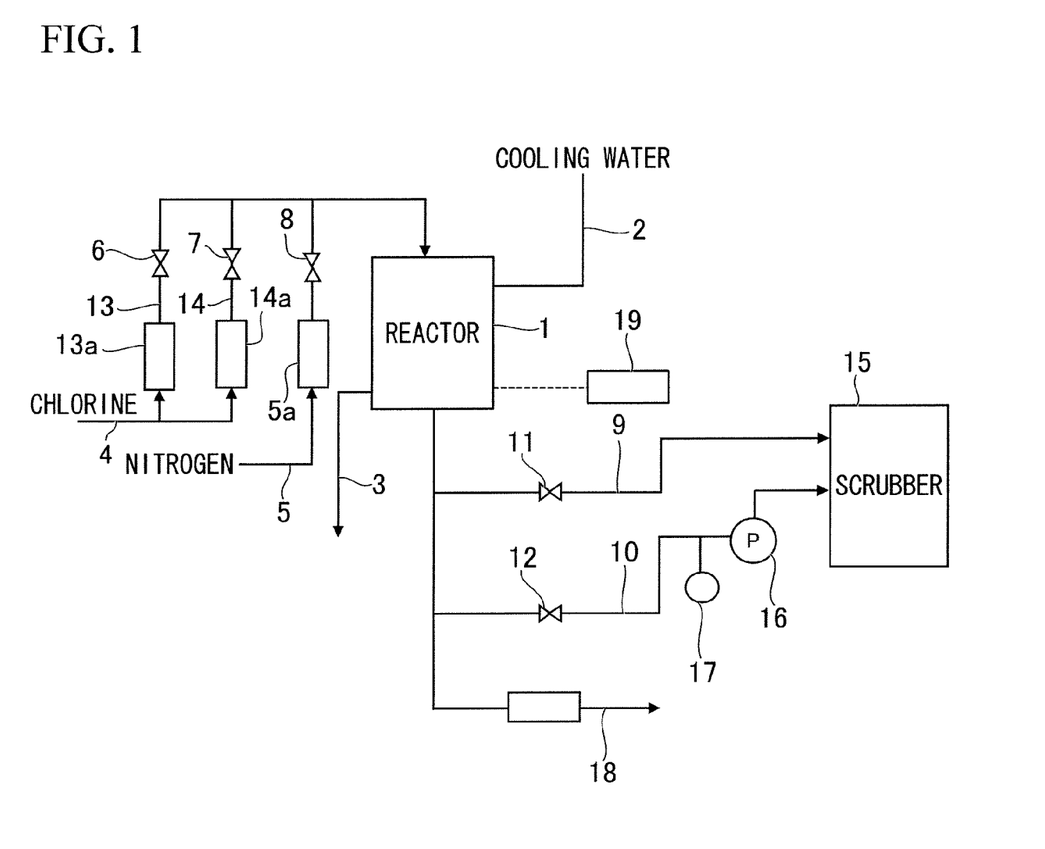
FIG. 1 is a piping diagram showing an example of a refining apparatus used in order to carry out a method of refining carbon parts according to the present invention.
Figure 2:
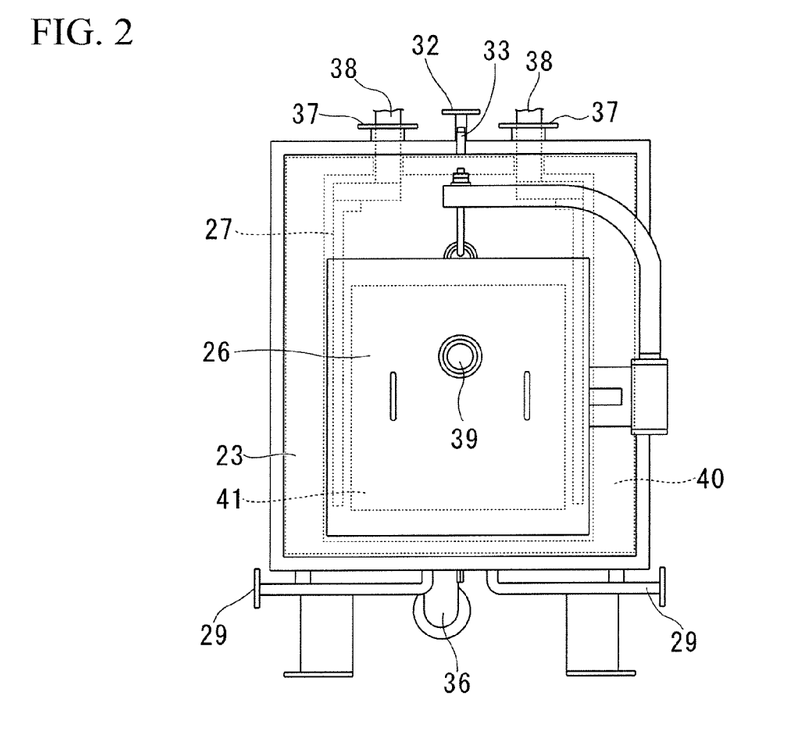
FIG. 2 is a front view of a reactor in the refining apparatus of FIG. 1.
Figure 3:
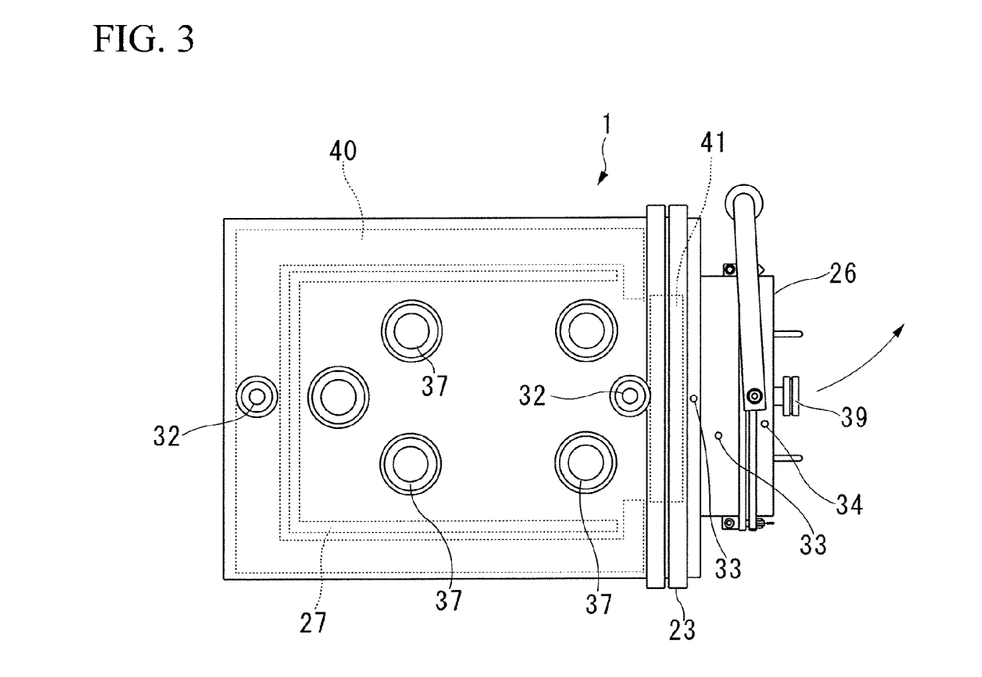
FIG. 3 is a top view of the reactor of FIG. 2.
Figure 4:
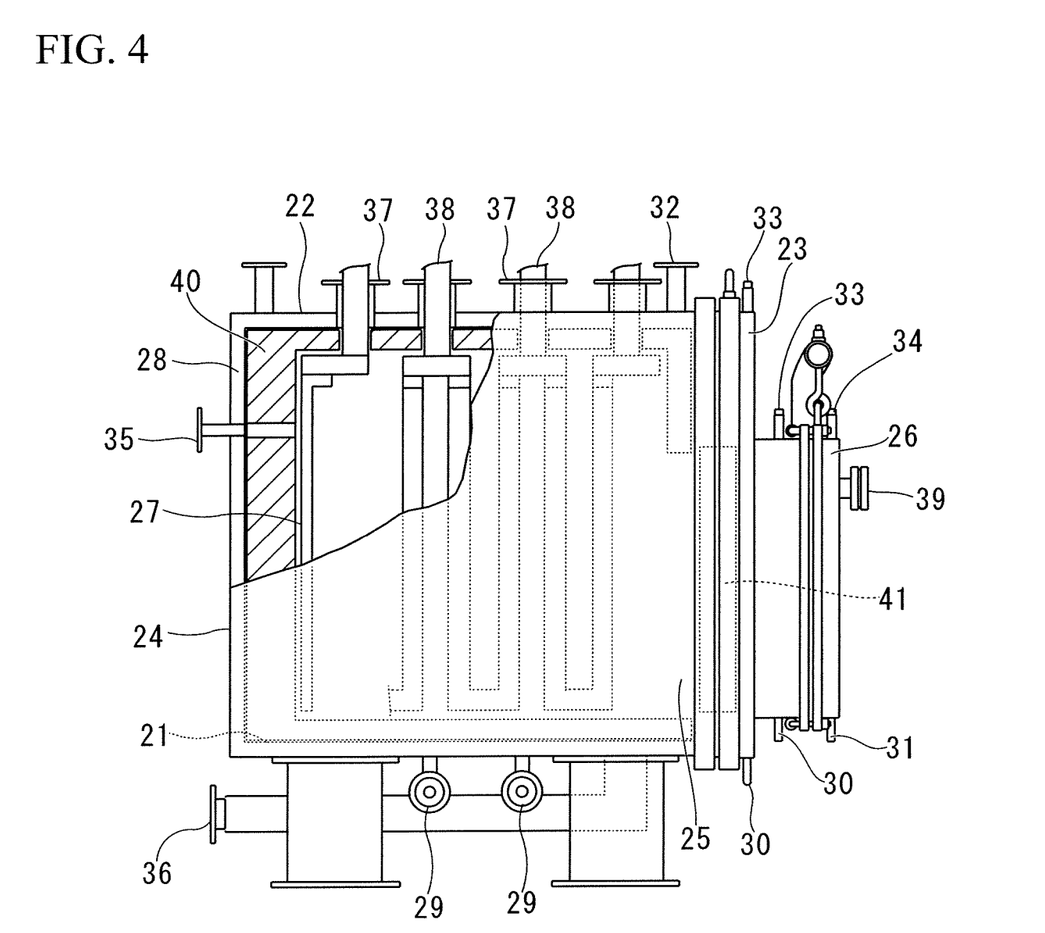
FIG. 4 is a side view of the reactor of FIG. 2.

FIG. 1 shows an example of a refining apparatus used in order to carry out this refining method. Reference numeral 1 represents a reactor. As shown in FIGS. 2 to 4, the reactor 1 is formed in the shape of a hexahedral box by a bottom wall 21, a top wall 22, a front wall 23, a rear wall 24, and side walls 25, and the front wall 23 is provided with an openable/closeable door 26. Additionally, a heater 27 is provided in a planar shape along the inner wall surfaces of the rear wall 24 and both the side walls 25 inside the reactor 1 and the internal temperature thereof is adjusted by the adjustment of the current of the heater 27. Additionally, the walls 21 to 25 and the door 26 of the reactor 1 is formed into a jacket structure, and a cooling medium is circulated through an internal space 28 of the reactor. Reference numerals 29 to 31 represent cooling fluid supply pipes, and reference numerals 32 to 34 represents cooling fluid discharge pipes. Additionally, the rear wall 24 of the reactor 1 is provided with a gas supply pipe 35 for introducing the nitrogen gas as the inert gas or chlorine gas into the inside of the reactor 1, and a gas exhaust pipe 36 for exhausting internal gas is provided rearward from the bottom wall 21. Reference numeral 37 represents a nozzle portion which allows an electrode 38 of the heater 27 to pass therethrough, and reference numeral 39 represents an observation window provided in the door 26. Additionally, reference numeral 40 represents a heat insulating material made of graphite set inside each of the walls 21 to 25, and the heat insulating material 41 is detachably provided even inside the door 26. The inert gas exhibits the argon gas, the helium gas, and the nitrogen gas.

A chlorine gas supply system 4 and a nitrogen gas supply system 5 are connected to the reactor 1 having such a configuration via valves 6 to 8, respectively, and a purge line 9 for exhaust and an evacuation line 10 are similarly connected via valves 11 and 12. In this case, two chlorine gas supply systems 4 are provided, and are a small-capacity line 13 where the opening degree of the valve 6 is small, and a large-capacity line 14 where the opening degree of the valve 7 is large. The supply systems 4 and 5 are provided with flow meters 13a, 14a, and 5a, respectively. Additionally, the purge 9 and the evacuation line 10 are connected to a scrubber 15, respectively. The evacuation line 10 is provided with a vacuum pump 16, such as a water-sealing pump. In addition, reference numeral 17 represents a differential pressure gage provided in the evacuation line 10, reference numeral 18 represents a safety device which detects the over the pressure in the reactor, and reference numeral 19 in FIG. 1 represents a control circuit which controls the heater, the individual valves, etc. on the basis of setting predetermined programs. Additionally, reference numeral 2 represents a cooling-water supply system, and reference numeral 3 represents a cooling-water discharge system.

Next, a method of refining the carbon parts will be described using the refining apparatus configured in this way.

Figure 5A:
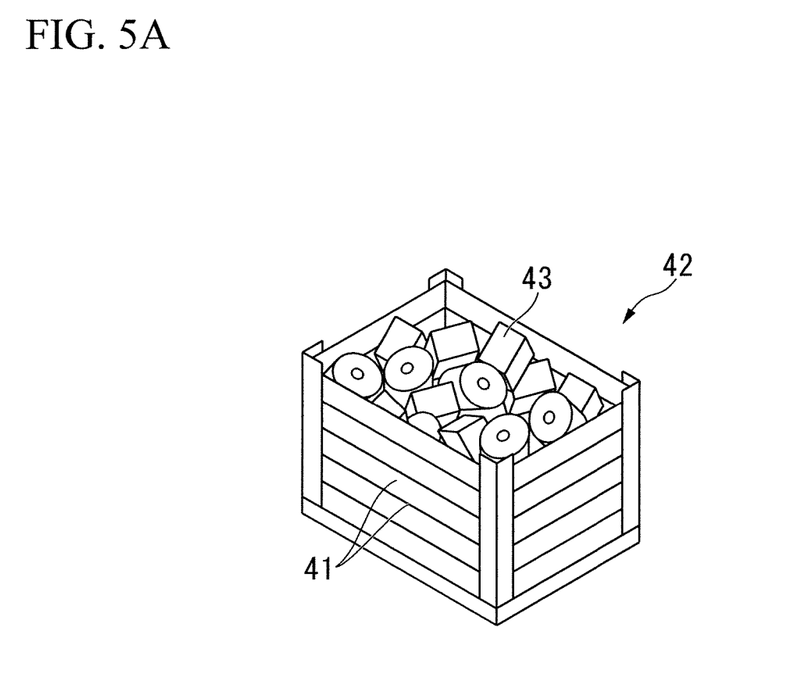
FIG. 5A shows a state where the parted carbon parts are put into a box.
Figure 5B:
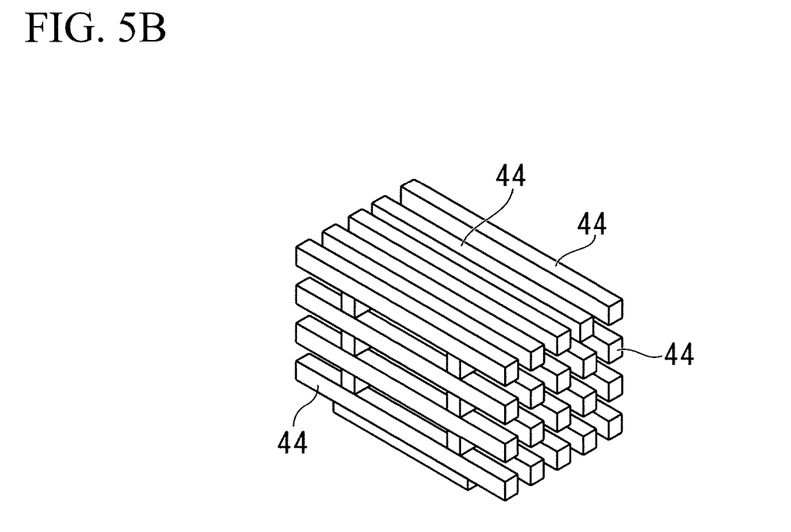
FIG. 5B shows a state where column-shaped carbon parts are stacked.
Figure 6:
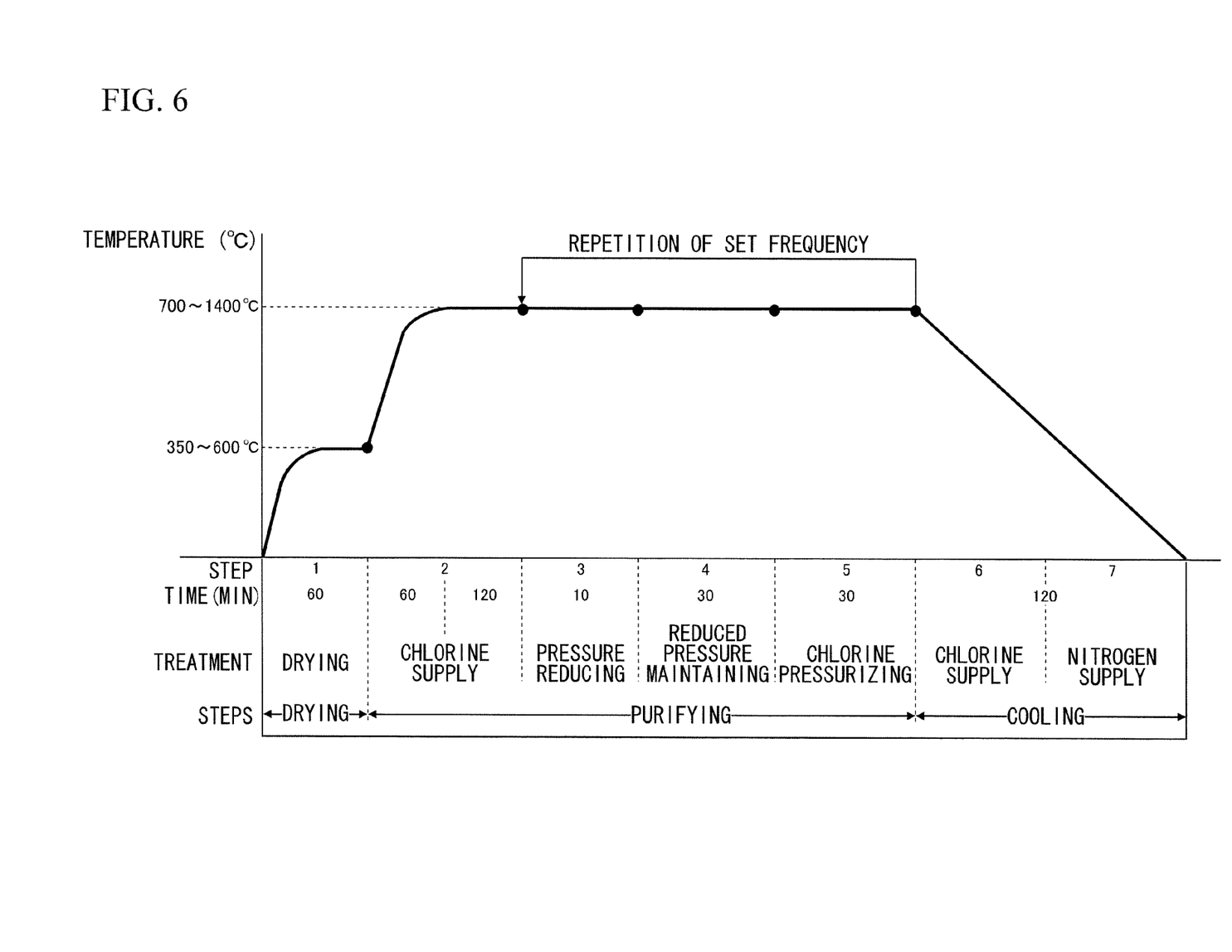
FIG. 6 is a chart showing the transition or the like of the temperature in the reactor in one embodiment of a method of refining the carbon parts according to the present invention.
Figure 7:
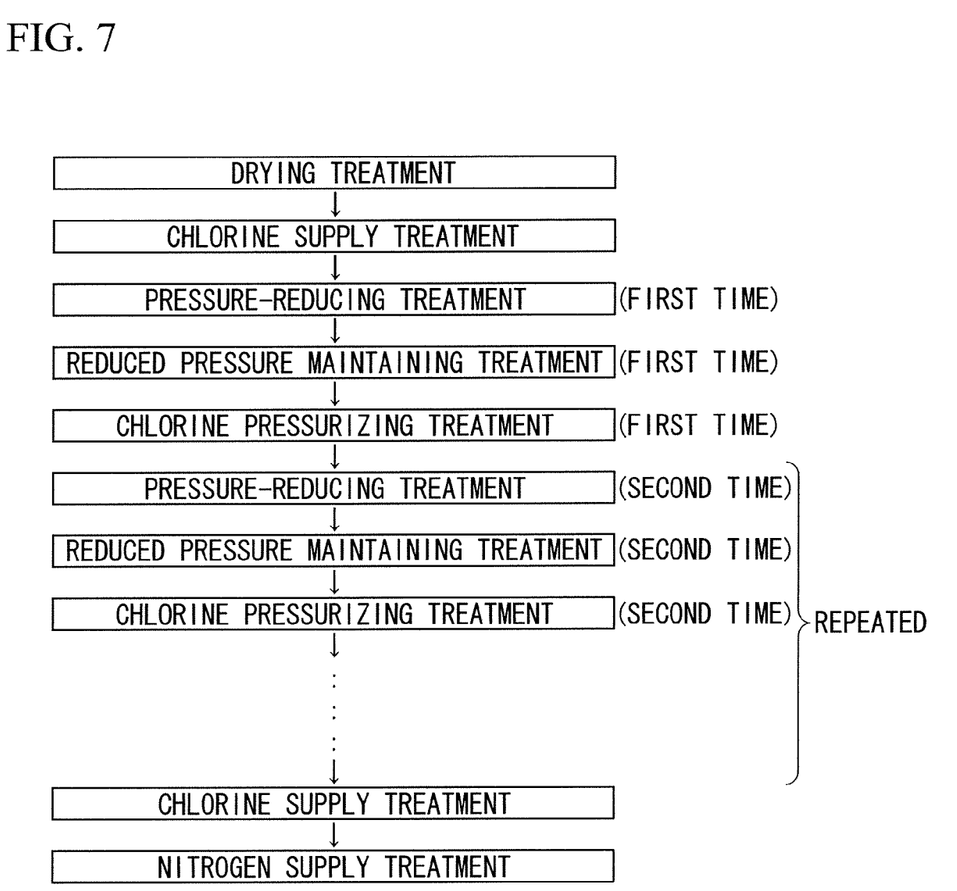
FIG. 7 is a flow chart showing the treatment in FIG. 6 in order.
Figure 8:
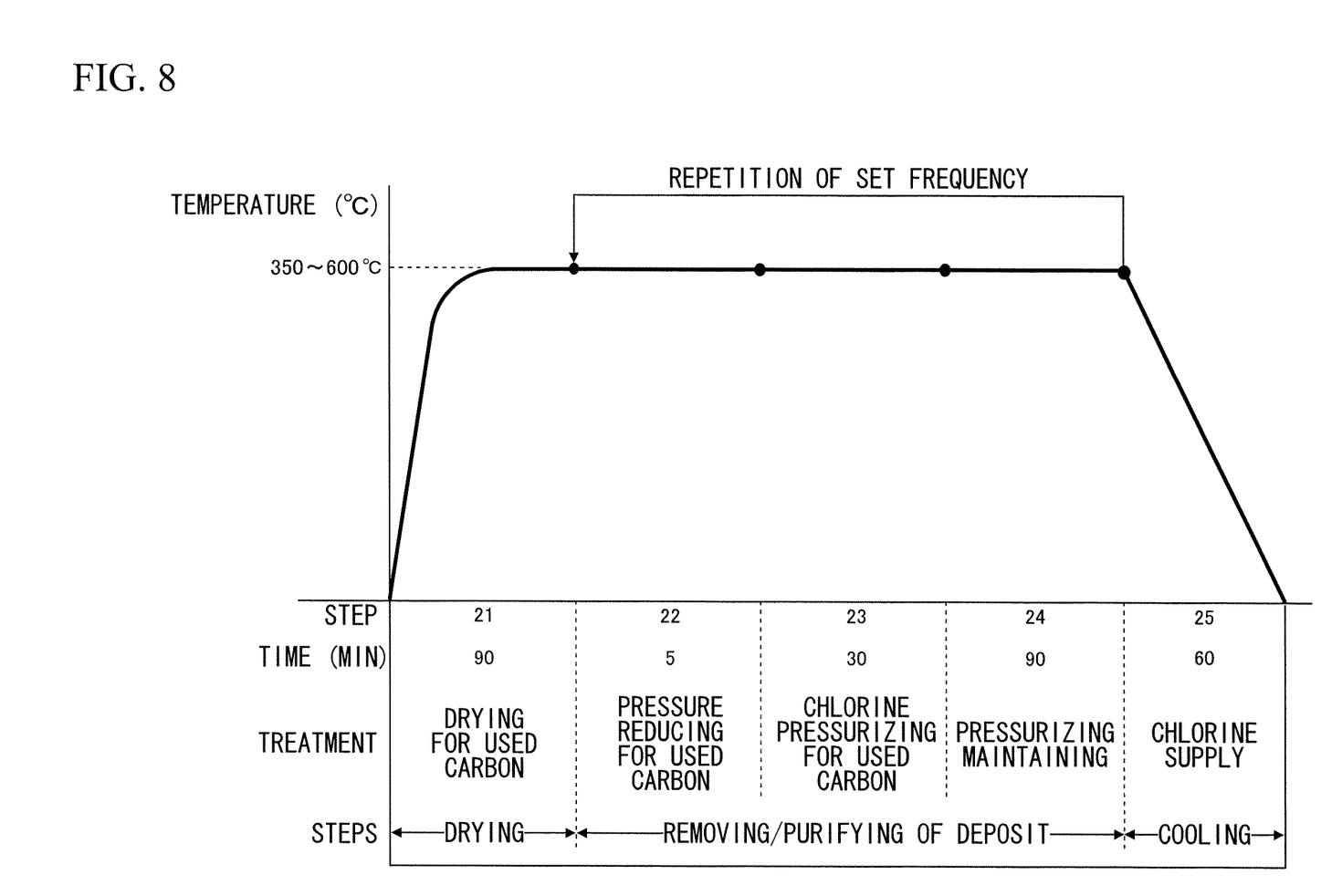
FIG. 8 is a chart showing the transition or the like of the temperature in the reactor during pretreatment in one embodiment of a method of refining the used carbon parts.
Figure 9:
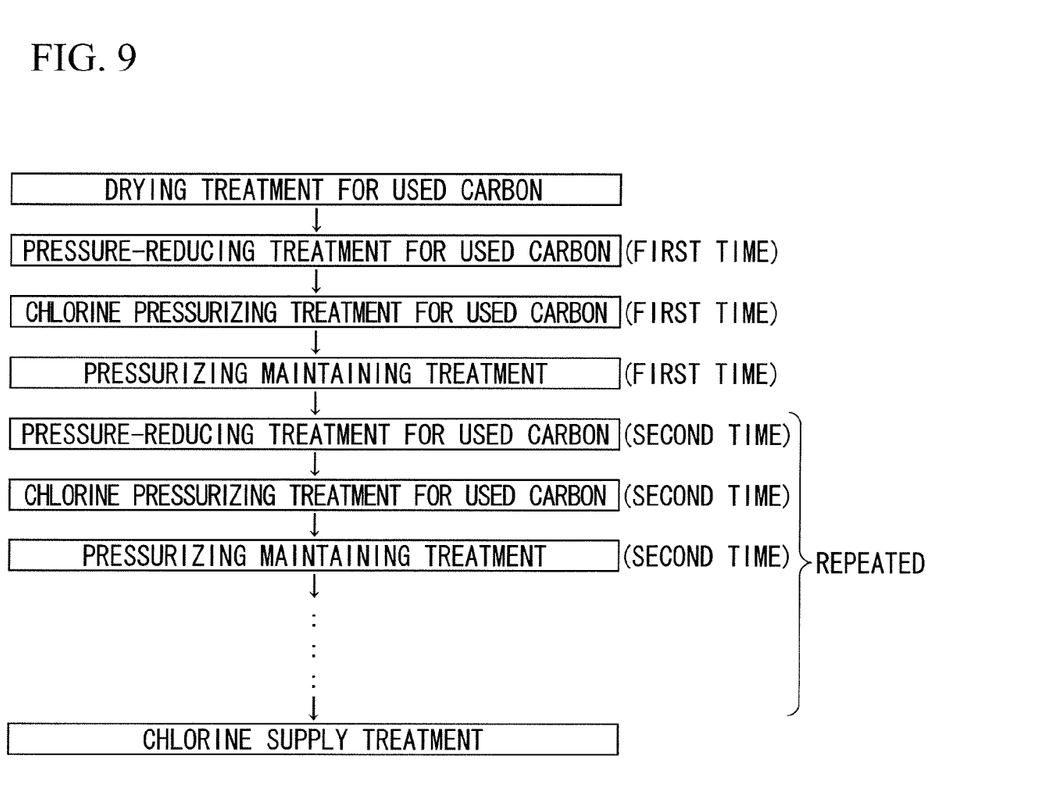
FIG. 9 is a flow chart showing the treatment in FIG. 8 in order.

FIGS. 5A and 5B shows the carbon parts placed in the reactor 1. FIG. 5A shows a state where parted carbon parts 43, such as nuts shape or caps shape, are put into a housing box 42 formed by a plurality of carbon plate 41. Each housing box 42 is placed in the reactor 1. FIG. 5B shows state where column-shaped carbon parts 44, such as a heater, are stacked. In this stacked state, the carbon parts 44 are placed in the reactor 1. In the refinement of the carbon parts, there are two kinds of methods including a case where the carbon parts that are unused articles are refined, and a case where the used carbon parts after having already been used for the production of polycrystalline silicon are refined. FIG. 6 is a chart showing the transition or the like of the temperature in the reactor when the unused carbon parts are refined, and FIG. 7 is a flow chart showing the treatment in FIG. 6 in order. FIG. 8 is a chart showing the transition or the like of the temperature in the reactor in the pretreatment when the used carbon parts are refined, and FIG. 9 is a flow chart showing the treatment in FIG. 8 in order.

First, a case where the unused carbon parts are refined will be described. The whole treatment is roughly classified into a drying process, a purifying process, and a cooling process.

Drying Process

The carbon parts are placed in the reactor 1, and the valve 8 of the nitrogen gas supply system 5 and the valve 11 of the purge line 9 are opened to perform replacement of gas while nitrogen gas is supplied into the reactor 1 (the step of (I-a)). Thereafter, the current of the heater is raised to elevate the temperature in the reactor to about 350° C. or more and about 600° C. or less, preferably in the range of about 400° C to about 550° C., thereby drying treatment of the carbon parts is performed (the step of (I-b)). If the drying temperature is under about 350+ C., the moisture will remain in the reactor 1 and the carbon parts. If the drying temperature is over about 600° C., energy loss will increase. The moisture in the carbon parts can be removed by supplying nitrogen gas for about one hour at a flow rate for about 3 m$^3$/hour when the volume of the reactor 1 is 1.2 m$^3$. Preferable flow rate F (m$^3$/hour) is 1.5 times or more and 4.0 times or less of the volume V (m$^3$) of the reactor 1.

Purifying Process

Next, the valve 8 of the nitrogen supply system 5 is closed and the valve 6 of the small-capacity line 13 of the chlorine gas supply system 4 is opened to flow chlorine gas through the reactor 1 which volume is 1.2 m$^3$ at a flow rate of, for example, 1 liter/min (the step of (I-c); chlorine supply treatment). At this time, as the current of the heater is further raised to bring a heating state, and about 3 hours have passed, the purification of the carbon parts proceeds in a state in which the temperature in the reactor is stabilized. At this time, the temperature in the reactor rises to a purification temperature of about 700° C. or more and about 1400° C. or less, preferably in the range of about 850° C. to about 1300° C. When the purification temperature is under about 700° C., the removal efficiency of the impurities may become insufficient. When the purification temperature is over about 1400° C., the reactor 1 may be damaged. In the purifying process, the flow rate F (m$^3$/hour) of chlorine gas is preferably 0.1 times or more and 0.5 times or less of the volume V (m$^3$) of the reactor 1.

Next, both the valves 6 of the chlorine gas supply system 4 and the valves 11 of the purge line 9 are closed and the valve 12 of the evacuation line 10 is opened to operate the vacuum pump 16 from a state where chlorine gas flows through the inside of the reactor 1, thereby evacuating the inside of the reactor 1 to perform pressure reduction (the step of (I-d); pressure-reducing treatment). Therefore, the chlorine gas and chloride of impurities generated by the reaction with the chlorine gas are discharged out of the reactor 1. Then, if the pressure in the reactor 1 reaches, for example, −0.09 MPa(G) ("G" exhibits a gauge pressure) with respect to an atmospheric pressure, the valve 12 of the evacuation line 10 is closed to maintain the inside of the reactor 1 in a reduced pressure state for, for example, 30 minutes (the step of (I-e); reduced pressure maintaining treatment). In this step, the pressure inside of the reactor is held in the range of about −0.1 MPa(G) to about −0.02 MPa(G), preferably in the range of about −0.1 MPa(G) to about −0.05 MPa(G) with respect to an atmospheric pressure. When the pressure of the inside of the reactor is within the above range, the impurities will be easily removed from the inside of the carbon parts.

Next, the valve 7 of the large-capacity line 14 of the chlorine gas supply system 4 is opened to pressurize the inside of the reactor 1 until the pressure in the reactor becomes, for example, about 0.01 MPa (G) with respect to an atmospheric pressure while chlorine gas is introduced into the reactor 1 (the step of (I-f); chlorine pressurizing treatment). In this step, the pressure inside of the reactor is pressed by introducing chlorine gas in the range of about 0.01 MPa(G) to about 0.05 MPa(G), preferably in the range of about 0.02 MPa(G) to about 0.05 MPa(G) with respect to an atmospheric pressure. Chlorine gas is made to permeate into the carbon parts and to react with impurities in the carbon parts by bringing the inside of the reactor 1 into a pressurized state for about 30 minutes. If the gauge pressure of the inside of the reactor 1 is maintained at about 0.01 MPa(G) or more, it is possible to prevent the inside of the reactor 1 from having negative pressure. If the pressure of the inside of the reactor 1 is about 0.05 MPa (G) or less, the chlorine gas can be prevented from leaking from the reactor 1.

Thereafter, the vacuum pump 16 is operated, and the valve 12 of the evacuation line 10 is opened to reduce the pressure in the reactor 1 to −0.09 MPa (G) with respect to an atmospheric pressure, and maintain the inside of the reactor in a reduced pressure state. Then, the inside of the reactor 1 is pressurized by introducing chlorine gas at 0.01 MPa (G) with respect to an atmospheric pressure (the step of (I-d) to the step of (I-f)).

That is, this purifying process repeats the step of (I-d) to the step of (I-f) by a required number of times, while the chlorine supply treatment of flowing chlorine gas through the reactor 1 (the step of (I-c)), the pressure-reducing treatment of performing evacuation to reduce pressure (the step of (I-d)), the reduced pressure maintaining treatment of maintaining the pressure in the reduced pressure reactor 1 to −0.09 MPa (G) (the step of (I-e)), and the chlorine pressurizing treatment of introducing chlorine gas from the reduced pressure state to pressurize the inside of the reactor 1 to 0.01 MPa (G) (the step of (I-f)). The repeated number of times, which is determined according to the size or the like of the carbon parts, becomes two times in the case of small parts, such as bolts shape or nuts shape, and becomes four times in the case of relatively large parts, such as heaters. After the plurality of times of treatments is repeated, the shift to the following cooling process is made.

Cooling Process

In the cooling process (the step of (I-g)), the valves 6 of the small-capacity line 13 of the chlorine gas supply system 4, and the valves 11 of the purge line 9 are opened to cool the inside of the reactor 1 over about 2 hours while flowing chlorine gas into the reactor 1 which volume is 1.2 m$^3$ at a flow rate of, for example, 1 liter/min (the step of (I-g1); chlorine supply treatment). Thereafter, the valve 6 of the chlorine gas supply system 4 is closed, and the valve 8 of the nitrogen gas supply system 5 is opened to introduce nitrogen gas into the reactor 1 which volume is 1.2 m$^3$ at a flow rate of, for example, 3.5 m$^3$/hour, thereby cooling the inside of the reactor 1 to room temperature while replacing the inside of the reactor 1 from a chlorine gas atmosphere to a nitrogen gas atmosphere (the step of (I-g2); nitrogen supply treatment). In the cooling process, the flow rate F (m$^3$/hour) of chlorine gas is preferably 0.02 times or more and 0.1 times or less of the volume V (m$^3$) of the reactor 1. In the cooling process, the flow rate F (m$^3$/hour) of inert gas is preferably 2.0 times or more and 5.0 times or less of the volume V (m$^3$) of the reactor 1.

By such a series of treatments, impurities, such as boron or phosphorus in the carbon parts, are removed, and are refined as high-purity carbons. That is, this refining method can make impurity elements in the carbon parts react with chlorine gas, thereby discharging the impurities, and alternately repeat the reaction with the chlorine gas and the maintain of the reduced pressure state, thereby making chlorine gas sufficiently react with internal impurities while making the impurities permeate even to the inside of the carbon parts, thereby removing the impurities.

Next, a method of refining the used carbon parts which have been provided for the production of polycrystalline silicon will be described.

With the production of polycrystalline silicon, polycrystalline silicon adheres to the surfaces of the carbon parts. For this reason, pretreatment for removing silicon deposit on the surfaces are first performed, and the same treatment as the treatment on the aforementioned the unused carbon parts are then performed. The treatment for removing this deposit is classified into a drying process, a deposit removing/purifying process, and a cooling process.

Drying Process

The carbon parts are placed in the reactor 1, and the valve 8 of the nitrogen gas supply system 5 and the valve 11 of the purge line 9 are opened to raise the temperature in the reactor while nitrogen gas is supplied into the reactor 1 which volume is 1.2 m$^3$ (the step of (II-a) and the step of (II-b); drying treatment for the used carbons). The moisture in the carbon parts is removed by performing nitrogen purging at a flow rate of, for example, about 2 m3/hour for about 90 minutes. The temperature in the reactor is raised to a silicon striping temperature. The silicon striping temperature is in the range of about 350° C. to about 600° C., preferably in the range of about 400° C to about 550° C. If the silicon striping temperature is under about 350° C., the moisture will remain in the reactor 1. If the silicon striping temperature is over about 600° C., silicon will be deposit in the reactor 1. In the Drying process, the flow rate F (m$^3$/hour) of chlorine gas is preferably 1.5 times or more and 4.0 times or less of the volume V (m$^3$) of the reactor 1.

Deposit Removing/Purifying Process

Both the valves 8 and 11 of the nitrogen gas supply system 5 and the valves 11 of the purge line 9 are closed and the valve 12 of the evacuation line 10 is opened to operate the vacuum pump 16 from a state where nitrogen gas flows through the inside of the reactor 1, thereby evacuating the inside of the reactor 1 to reduce pressure (the step of (II-c); pressure-reducing treatment for the used carbon). Even in this case, when the inside of the reactor 1 is brought into a reduced pressure state of −0.09 MPa (G) with respect to an atmospheric pressure, the valve 12 of the evacuation line 10 is closed. In this step, the pressure inside of the reactor 1 is held in the range of about −0.1 MPa(G) to about −0.02 MPa(G), preferably in the range of about −0.1 MPa(G) to about −0.05 MPa(G) with respect to an atmospheric pressure. When the pressure of the inside of the reactor is within the above range, the impurities will be easily removed from the inside of the carbon parts.

Next, the valve 6 or 7 of any line 13 or 14 of the chlorine gas supply systems 4 is opened to introduce chlorine gas into the reactor 1 (the step of (II-d); chlorine pressurizing treatment for the used carbon). Then, if the pressure in the reactor 1 becomes, for example, about 0.01 MPa (G) with respect to an atmospheric pressure, the valve 6 or 7 is closed to bring chlorine gas into a confined state in the reactor 1 (the step of (II-e); pressurizing maintaining treatment). In this step, the pressure inside of the reactor is pressed by introducing chlorine gas in the range of about 0.01 MPa(G) to about 0.05 MPa(G), preferably in the range of about 0.02 MPa(G) to about 0.05 MPa(G) with respect to an atmospheric pressure. If the gauge pressure of the inside of the reactor is maintained at about 0.01 MPa(G) or more, it is possible to prevent the inside of the reactor 1 from having negative pressure. If the pressure of the inside of the reactor 1 is about 0.05 MPa(G) or less, the chlorine gas can be prevented form leaking from the reactor 1. This state is held for, for example, 90 minutes, chlorine gas is made to permeate into the carbon parts, and the silicon deposit is made to react with the chlorine gas into silicon tetrachloride or the like. This silicon tetrachloride has a boiling point of 57° C. Evacuation of chlorine gas and introduction of chlorine gas (the step of (II-c) to (II-e)) may be alternately performed for necessary times, for example, two times, according to the amount of a deposit, by alternately opening and closing the valve 6 or the valve 7.

Cooling Process

In the cooling process, the opening and closing of the valve are switched to open the valve 8 of the nitrogen gas supply system 5 to introduce nitrogen gas into the reactor 1 which volume is 1.2 m$^3$ at a flow rate of, for example, 3.5 m$^3$/hour, thereby cooling the inside of the reactor 1 to room temperature while replacing the inside gas of the reactor from a chlorine gas atmosphere to a nitrogen gas atmosphere. The cooling time is about 60 minutes. In the cooling process, the flow rate F (m$^3$/hour) of chlorine gas is preferably 2.0 times or more and 5.0 times or less of the volume V (m$^3$) of the reactor 1.

Figure 10:
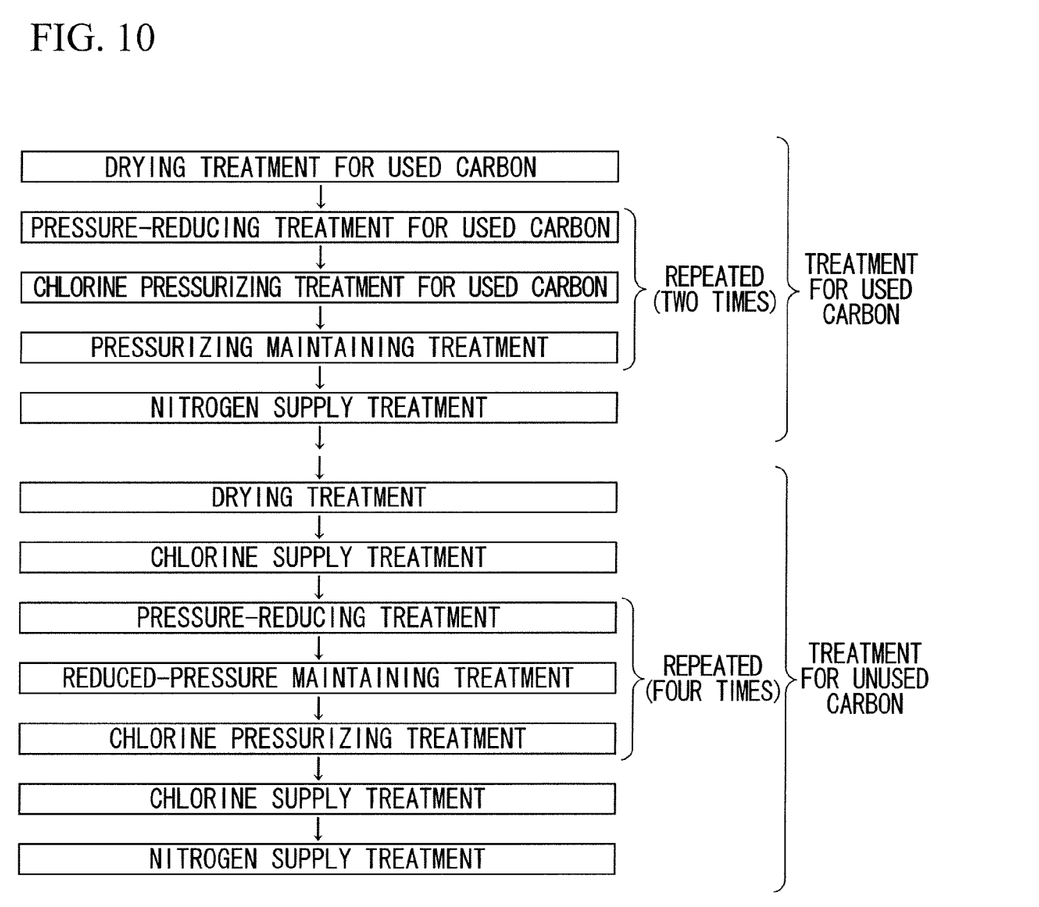
FIG. 10 is a flow chart showing a series of treatments in one embodiment of the method of refining the used carbon parts in order.

A series of heat treatments including a drying process, a purifying process, and a cooling process are performed by the same method shown in FIG. 6 as the aforementioned method applied to the unused carbon parts after a series of treatments of the drying process, the deposit removing process, and the cooling process. In this case, the number of repetitions of each treatment of the pressure-reducing treatment (the step of (II-g)), the reduced pressure maintaining treatment (the step of (II-h)), and the chlorine pressurizing treatment (the step of (II-i)) is set to four times. A flow chart in which the treatment in a pattern shown in the FIG. 8 and the treatment in a pattern shown in FIG. 6 in the used carbon parts are continuously performed is shown in FIG. 10.

If the carbon parts are taken out from the reactor 1 after the treatment in this way, most of adhering silicon disappears as silicon tetrachloride, and the remaining silicon deposit is also removed off from the carbon parts. Therefore, the deposit can be easily removed. Additionally, internal impurities are removed, and are reproduced as high-purity carbon parts.

The unused and used carbon parts which have been subjected to aforementioned treatment are used, polycrystalline silicon are deposited by the Siemens type reactor (the specifications of individual reactors A to D are the same, and reaction conditions are also almost the same), and the results obtained by performing quality inspection are shown in Table 1. As the polycrystalline silicon, high-purity polycrystalline silicon which has a resistivity serves of 3000 to 4000 Ωcm, a phosphorus concentration of 0.02 to 0.03 ppba (parts per billion atomic), and a boron concentration of 0.006 to 0.007 ppba can be obtained. As for the unused carbon parts, the number of repetitions of the pressure-reducing treatment (the step of (I-d)), the reduced pressure maintaining treatment (the step of (I-e)), and the chlorine pressurizing treatment (the step of (I-f)) was two times in the treatment according to the pattern shown in FIG. 6. The total treatment time was about 8.5 hours. Additionally, as for the used carbon parts, the number of repetitions of the pressure-reducing treatment for the used carbon (the step of (II-c)), the chlorine pressurizing treatment for the used carbon (the step of (II-d)), and the pressurizing maintaining treatment (the step of (II-e)) was two times in the treatment according to the pattern shown in FIG. 8. Thereafter, the number of repetitions of the pressure-reducing treatment (the step of (II-g)), the reduced pressure maintaining treatment (the step of (II-h)), and the chlorine pressurizing treatment (the step of (II-i)) was four times in the treatment according to the pattern shown in FIG. 6. The total treatment time was about 17.7 hours. The numerical values in parentheses in the individual reactors in Table 1 show the number of polycrystalline silicon reaction batches, and the numerical values of resistivity, phosphorus concentration, and boron concentration shows the average values of the batches.

On the other hand, as a comparative example, the treatment by the flowing chlorine gas as shown in Japanese Patent Publication No. 2649166 is performed on the unused carbon parts by using a gas flowing type reactor by the heating of an outer casing heater which uses a quartz tube reactor. Polycrystalline silicon is deposited by Siemens type reactor E using this unused carbon parts. The results of resistivity, and boron and phosphorus concentration after the deposition of polycrystalline silicon using the processed carbon parts are additionally shown in Table 1. In the comparative example, heater setting temperature was about 900° C., using a quartz tube reactor having a diameter 4100 mm and a length of 2 m. The treatment method included a chlorine gas treatment (8 hours), followed by a nitrogen gas treatment, a chlorine gas treatment (8 hours), and then a nitrogen gas treatment.

TABLE 1

|  |  | Resistivity ($\Omega$-cm) | Phosphorus (ppba) | Boron (ppba) | Number of Repetition |
|---|---|---|---|---|---|
| Working example | Siemens type reactor A (n = 33 batches) | 3,685 | 0.027 | 0.006 | Unused article: two times (about 8.5 hours) Reused article: Total of 6 times (about 17.7 hours |
|  | Siemens type reactor B (n = 34 batches) | 4,081 | 0.024 | 0.006 |  |
|  | Siemens type reactor C (n = 33 batches) | 3,576 | 0.025 | 0.006 |  |
|  | Siemens type reactor D (n = 34 batches) | 3,490 | 0.025 | 0.007 |  |
| Comparative example | Siemens type reactor E (n = 23 batches) | 1,769 | 0.053 | 0.008 |  |

Additionally, in the case of a working example, this treatment time is shown in Table 2 depending on the number of repetitions. The treatment time is an integrated value of time for each treatment time shown in FIGS. 6 or 8.

TABLE 2

| | Treatment according to pattern of FIG. 8 | | Treatment according to pattern of FIG. 6 | | |
|---|---|---|---|---|---|
| | Number of repetition | Treatment time (time) | Number of repetition | Treatment time (hours) | Total treatment time (hours) |
| Carbon member (Unused article) | | | one time | About 7.2 | ← |
| | | | two times | About 8.3 | ← |
| | | | three times | About 9.5 | ← |
| | | | four times | About 10.7 | ← |
| Carbon member (Reused article) | two times | About 6.7 | two times | About 8.3 | About 15.0 |
| | | | three times | About 9.5 | About 16.2 |
| | | | four times | About 10.7 | About 17.4 |

Moreover, the results obtained by confirming the refining effects depending on the existence/nonexistence of the chlorine supply treatment or the number of repetitions according to resistivity with respect to the used carbon parts are shown in Table 3. In this case, the treatment temperature is set to about 500° C., and the removal treatment time is about 2.5 hours/cycle.

TABLE 3

| | Resistivity ($\Omega$-cm) |
|---|---|
| No chlorine supply treatment (only removal) | 1,080 |
| Chlorine supply treatment (one time) | 1,510 |
| Chlorine supply treatment (two times) | 2,230 |
| Chlorine supply treatment (three times) | 2,710 |
| Chlorine supply treatment (four times) | 3,540 |

It can be understood from these results that high-purity carbon parts are obtained in a short-time treatment in the refining method of the present invention. In addition, as for the number of repetitions of treatment, the unused carbon parts may be subjected to a pressure-reducing treatment, a reduced pressure maintaining treatment, and a chlorine pressurizing treatment at least two times. Regarding the number of cycles of treatment, the used carbon parts may be subjected to the treatment according to the pattern of FIG. 8, i.e., the pressure-reducing treatment for the used carbon, the chlorine pressurizing treatment for the used carbon, and the pressurizing maintaining treatment two times, and may be then subjected to the treatment according to the pattern of FIG. 6, i.e., the pressure-reducing treatment, the reduced pressure maintaining treatment, and the chlorine pressurizing treatment four times.

In addition, it should be understood that the present invention is not limited to the above embodiment, but various modifications can be made without departing from the spirit or scope of the present invention.

For example, in the above embodiment, nitrogen gas was used in the inert gas replacing or drying process in the reactor. However, inert gas other than nitrogen gas may be used. Additionally, although two chlorine gas supply systems of the small-capacity line and the large-capacity line are provided, the flow rate may be adjusted by one system. Additionally, when the used carbon parts are processed, the treatment according to the treatment pattern shown in FIG. 6 is performed after the end of the treatment pattern shown in FIG. 8. However, when the treatment shown in FIG. 6 is continuously performed after the treatment shown in FIG. 8, the cooling process shown in FIG. 8 and the drying process shown in FIG. 6 may be omitted.

What is claimed is:

1. A method of refining carbon parts for the production of polycrystalline silicon, comprising the steps of:
   a) replacing an inside gas of a reactor, in which the carbon parts are placed, with an inert gas;
   b) drying the carbon parts by raising a temperature in the reactor to a drying temperature of the carbon parts while flowing an inert gas through the reactor after the step of a);
   c) raising a temperature in the reactor to a purification temperature higher than the drying temperature while flowing chlorine gas through the reactor after the step of b);
   d) reducing a pressure in the reactor after the step of c);
   e) maintaining the inside of the reactor in a reduced pressure caused by the step of d);
   f) pressurizing the inside of the reactor by introducing chlorine gas for bringing the inside of the reactor into a pressurized state after the step of e); and
   g) cooling the inside of the reactor after the step of f).

2. The method of refining carbon parts for the production of polycrystalline silicon according to claim 1,
   wherein in the step of e) the pressure inside of the reactor is held in the range of about −0.1 MPa(G) to about −0.02 MPa(G) with respect to an atmospheric pressure.

3. The method of refining carbon parts for the production of polycrystalline silicon according to claim 1,
   wherein in the step of f) the pressure inside of the reactor is pressurized by introducing chlorine gas in the range of about 0.01 MPa(G) to about 0.05 MPa(G) with respect to an atmospheric pressure.

4. The method of refining carbon parts for the production of polycrystalline silicon according to claim 1,
   wherein the drying temperature is in the range of about 350° C. to about 600° C., and the purification temperature is in the range of about 700° C. to about 1400° C.

5. The method of refining carbon parts for the production of polycrystalline silicon according to claim 1,
   wherein the inside of the reactor is cooled after the steps of d) to f) are repeated two or more times.

6. A method of refining used carbon parts for the production of polycrystalline silicon, comprising the step of:
   a) replacing an inside gas of a reactor in which the used carbon parts are placed, with an inert gas;
   b) drying the used carbon parts by raising a temperature in the reactor to a silicon striping temperature while flowing an inert gas through the reactor after the step of a);
   c) reducing a pressure in the reactor after the step of b);
   d) pressurizing the inside of the reactor by introducing chlorine gas after the step of c);
   e) maintaining the inside of the reactor in a pressurized state by introducing chlorine gas after the step of d);
   f) raising a temperature in the reactor to a purification temperature while flowing chlorine gas through the reactor after the step of e);
   g) reducing the pressure in the reactor after the step of f);
   h) maintaining the inside of the reactor in a reduced pressure caused by the step of g);
   i) pressurizing the inside of the reactor by introducing chlorine gas for bringing the inside of the reactor into a pressurized state after the step of h); and
   j) cooling the inside of the reactor after the step of i).

7. The method of refining used carbon parts for the production of polycrystalline silicon according to claim 6,
   wherein in the step of c) the pressure inside of the reactor is held in the range of about −0.1 MPa(G) to about −0.02 MPa(G) with respect to an atmospheric pressure.

8. The method of refining used carbon parts for the production of polycrystalline silicon according to claim 6,
   wherein in the step of e) the inside of the reactor is pressurized by introducing chlorine gas in the range of about 0.01 MPa(G) to about 0.05 MPa(G) with respect to an atmospheric pressure.

9. The method of refining used carbon parts for the production of polycrystalline silicon according to claim 6,
   wherein the silicon striping temperature is in the range of about 350° C. to about 600° C.

10. The method of refining used carbon parts for the production of polycrystalline silicon according to claim 6,
    wherein the purification temperature is in the range of about 700° C. to about 1400° C.

11. The method of refining used carbon parts for the production of polycrystalline silicon according to claim 6,
    wherein shifting to the step of f) is made after the step of c) to e) are repeated two or more times.

12. The method of refining used carbon parts for the production of polycrystalline silicon according to claim 6 comprises a cooling step and a drying step between the step of e) and the step of f),
    wherein in the cooling step the inside of the reactor is cooled, and then, in the drying step the temperature in the reactor is raised to drying temperature and an inert gas is flowed through the reactor to dry the carbon parts.

13. The method of refining used carbon parts for the production of polycrystalline silicon according to claim 12,
    wherein the drying temperature is in the range of about 350° C. to about 600° C.

14. The method of refining used carbon parts for the production of polycrystalline silicon according to claims 6,
    wherein the inside of the reactor is cooled after the steps of g) to i) are repeated.

* * * * *